United States Patent
Agostini et al.

(10) Patent No.: US 6,753,375 B2
(45) Date of Patent: Jun. 22, 2004

(54) PROCESS FOR PREPARING COMPOSITE, COMPOSITION AND ARTICLE THEREOF

(75) Inventors: Giorgio Agostini, Grand Duchy (LU); Thierry Florent Edme Materne, Richfield, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 202 days.

(21) Appl. No.: 09/897,316

(22) Filed: Jul. 2, 2001

(65) Prior Publication Data

US 2003/0004228 A1 Jan. 2, 2003

(51) Int. Cl.$^7$ .............................. C08J 3/00; C08K 3/34
(52) U.S. Cl. ..................... 524/496; 524/493; 524/430; 525/332.5; 525/332.6; 523/215
(58) Field of Search .................... 523/215; 524/495, 524/496, 430, 418, 419, 423, 433, 437; 525/332.5, 332.6, 333.3, 333.5

(56) References Cited

U.S. PATENT DOCUMENTS

| | | | | |
|---|---|---|---|---|
| 3,294,733 A | | 12/1966 | Medalia et al. ............ | 260/41.5 |
| 3,298,984 A | | 1/1967 | Rye ........................... | 260/29.3 |
| 3,304,281 A | | 2/1967 | Tucker ...................... | 260/33.6 |
| 3,317,458 A | | 5/1967 | Bonn et al. ................ | 260/41.3 |
| 3,345,324 A | | 10/1967 | Bristol et al. .............. | 260/41.5 |
| 3,350,342 A | | 10/1967 | Begley ...................... | 260/33.6 |
| 3,491,052 A | | 1/1970 | Hare et al. ................. | 260/29.7 |
| 3,533,988 A | | 10/1970 | Morris et al. .............. | 260/41.5 |
| 3,767,605 A | | 10/1973 | Gerlicher ................... | 260/23.7 |
| 3,923,707 A | | 12/1975 | Berg et al. ................. | 260/17 R |
| 4,816,594 A | * | 3/1989 | Wengong et al. .......... | 556/182 |
| 5,869,550 A | * | 2/1999 | Mahmud et al. ........... | 523/215 |
| 6,136,919 A | | 10/2000 | Zimmer et al. ............ | 524/856 |
| 6,329,449 B1 | * | 12/2001 | Gorl et al. ................. | 523/343 |
| 6,340,724 B1 | * | 1/2002 | Gorl et al. ................. | 524/442 |

FOREIGN PATENT DOCUMENTS

| | | | | |
|---|---|---|---|---|
| DE | 10113221 | 3/2001 | ............ | C08C/2/06 |
| EP | 1010718 | 6/2000 | ............ | C08J/3/215 |
| EP | 1055696 | 11/2000 | ............ | C08J/3/215 |
| EP | 1191052 | 3/2002 | ............ | C08J/3/205 |

* cited by examiner

Primary Examiner—Katarzyna Wyrozebski
(74) Attorney, Agent, or Firm—Henry C. Young, Jr.

(57) ABSTRACT

This invention relates to preparation of a rubber composition by pre-mixing at least one functionalized carbon black with an organic solvent solution or aqueous emulsion of at least one host elastomer. Functionalized carbon blacks for the purposes of this invention preferably contain a functional moiety on their surface to aid in promoting covalent bonds between the functionalized carbon black and said host polymer. The invention also contemplates the use of such rubber composition, or blend of such rubber composition with at least one additional elastomer and/or rubber compounding ingredient, as a component of an article of manufacture. Such article of manufacture may be, for example, a tire. Such article may also be an industrial product such as, for example, a hose or belt such as a conveyor belt or power transmission belt.

9 Claims, No Drawings

PROCESS FOR PREPARING COMPOSITE, COMPOSITION AND ARTICLE THEREOF

FIELD OF THE INVENTION

This invention relates to preparation of a rubber composition by pre-mixing at least one functionalized carbon black with an organic solvent solution or aqueous emulsion of at least one host elastomer. Functionalized carbon blacks for the purposes of this invention preferably contain a functional moiety on their surface to aid in promoting covalent bonds between the functionalized carbon black and said host polymer. The invention also contemplates the use of such rubber composition, or blend of such rubber composition with at least one additional elastomer and/or rubber compounding ingredient, as a component of an article of manufacture. Such article of manufacture may be, for example, a tire. Such article may also be an industrial product such as, for example, a hose or belt such as a conveyor belt or power transmission belt.

BACKGROUND OF THE INVENTION

Carbon black reinforcement, is conventionally blended with various elastomers with the aid of various internal mixers, as well as open roll mixers, under high sheer and relative high temperature conditions. Accordingly a considerable amount stress is experienced by the rubber composition as well as expenditure of energy to accomplish the aforesaid mixing.

Historically, blends of carbon black and various elastomers have been prepared by various masterbatching processes in which the carbon black is pre-mixed in an aqueous and/or organic solvent medium with one or more elastomers and the resulting pre-mixture dried and then usually mixed with one or more additional elastomers. For example see U.S. Pat. Nos. 3,294,733; 3,298,984; 3,317,458; 3,345,324; 3,491,052; 3,767,605, 3,923,707, 3,350,342, 3,304,281, 3,491,052 and 3,533,988.

However, this invention is directed to pre-modifying typically hydrophobic rubber reinforcing carbon black prior to masterbatching carbon black and diene-based elastomer in an aqueous or organic solvent medium by functionalizing the carbon black to cause it to be more hydrophilic in nature in order to enhance the blending thereof with a diene-based elastomer.

While U.S. Pat. No. 6,136,919 relates to a rubber composition and tire with tread thereof wherein said rubber composition is prepared by polymerization of monomers in the presence of modified carbon blacks to create a reinforced elastomer, such method is not considered herein to be a masterbatching of functionalized carbon black with a diene-based elastomer in an aqueous or organic solvent medium to enhance a covalent binding of the carbon black with its elastomer host.

In the description of this invention, the term "phr" relates to parts by weight of an ingredient per 100 parts by weight of rubber.

The terms "rubber" and "elastomer" are used interchangeably unless otherwise specified.

The term "Tg" relates to a glass transition temperature of an elastomer, normally determined by a differential scanning (DSC) calorimeter with a temperature rise of 10° C. per minute.

DISCLOSURE AND PRACTICE OF THE INVENTION

In accordance with this invention, a process of preparing a composite comprised of at least one elastomer which contains a dispersion therein of a functionalized carbon black which comprises blending a particulate, functionalized carbon black with (A) an organic solvent solution of a conjugated diene-based elastomer selected from at least one elastomer as a homopolymer of isoprene and/or 1,3-butadiene and elastomer as a copolymer of isoprene and/or 1,3-butadiene with styrene, followed by removing said solvent therefrom to recover said composite, or (B) an aqueous emulsion of a styrene/butadiene copolymer elastomer followed by removing said water therefrom to recover said composite;

wherein said functionalized carbon black is a rubber reinforcing carbon black modified by having domains of at least one moiety on the surface thereof selected from (A) silanol, siloxane, titanium oxide, titanium hydroxide, zirconium oxide, zirconium hydroxide and aluminum hydroxide groups;

(B) aryl polysulfide, alkyl polysulfide, thiol, thiophenol, epoxide, allyl and vinyl groups; and (C) dibenzyldisulfide, ditolydisulfide, bis(propyl) disulfide, bis(propyl)tetrasulfide, n-propyl thiol, n-butyl thiol, orthomethylthiophenol, n-propyl epoxide, n-butyl epoxide, methyl allyl, propyl allyl, methyl vinyl and propyl vinyl groups.

Preferably, said functionalized carbon black is a carbon black which has been modified to contain domains on the carbon black surface to promote covalent bonds between the functionalized carbon black and the host polymer, particularly for use in the masterbatching dispersion procedure of this invention.

In one aspect of the invention, said composite is prepared adding said modified carbon black as a dispersion thereof in an organic solvent to an organic solvent solution of elastomer.

In another aspect of the invention, the composite is prepared by adding said modified carbon black as a dispersion thereof in water and therefore as an aqueous dispersion, to an aqueous emulsion of said styrene/butadiene elastomer.

A reference to such preparation of modified carbon black may be found in aforesaid U.S. Pat. No. 6,136,919 which is hereby incorporated herein by reference in its entirety.

In practice, said solvent solution of said elastomer may be a polymerizate.

In further accordance with this invention, a composite is provided which is comprised of an elastomer with a dispersion therein of a functionalized carbon black prepared by the method of this invention.

In additional accordance with this invention, an article of manufacture is provided having at least one component comprised of said composite.

In further accordance with this invention, a tire is provided having at least one component comprised of said composite.

In additional accordance with this invention, a tire is provided having a tread of a rubber composition comprised of said composite.

In an further aspect of this invention, a rubber composition is provided as a blend of said composite and at least one hydrocarbon diene-based elastomer.

Such rubber composition may contain, if desired, at least one reinforcing filler selected from carbon black and amorphous precipitated silica.

In one aspect of the invention, said precipitated silica may be an amorphous precipitated silica which is pre-treated, prior to blending with said composite, by reacting said silica, preferably a precipitated silica, with an organosilane of the general formula (I):

(I)

wherein R is the same or different alkyl radical selected from at least one of ethyl and methyl radicals, preferably the same radicals and preferably an ethyl radical; R' is the same or different radical selected from at least one of ethyl, propyl and butyl radicals, preferably the same radical and preferably a propyl radical; and n is a value from 2 to 6 with an average of from 2 to 2.6 or from 3.5 to 4.

Thus, such organosilane may be a bis(3-alkoxysilylalkyl) polysulfide with an average of from 2 to 2.6 or from 3.5 to 4 connecting sulfur atoms in its polysulfidic bridge. Representative thereof is a bis (3-ethoxysilylpropyl) polysulfide.

In another aspect of the invention, said organic solvent solution of elastomer(s) may be composed of at a multiplicity of least two individual organic solvent solutions of elastomers (A) which are pre-blended prior to addition of said functionalized carbon black or (B) which at least one of said of elastomer solutions is blended with at least one additional organic solvent elastomer solution subsequent to said functionalized carbon black addition thereto or (C) which at least one of said elastomer solutions is blended with at least one additional organic solvent elastomer solution substantially simultaneously with said functionalized carbon black addition.

In one aspect of the invention, the said organic solvent solution of at least one elastomer may be a polymerizate (an elastomer together with its solvent in which it has been prepared by polymerization reaction of an appropriate monomer in the presence of a catalyst—which is sometimes referred to as a cement).

In practice, said polymerizate may be polymerizate in which the polymerization reaction has not been terminated and which may be referred to as a living polymerizate. In such case, it is envisioned that, as the polymerization continues, the polymer may interact with the filler to create an improved, or more efficient and integral dispersion of the filler within the elastomer host.

In further accordance with the process of this invention, the resultant rubber composition is blended with at least one additional diene-based elastomer and/or compounding ingredient then sulfur vulcanized.

In additional accordance with the process of this invention, an article of manufacture is prepared having at least one component of the rubber composition of this invention or as blend with at least one additional elastomer and/or compounding ingredient.

In practice, the article of manufacture of this invention may be, for example, a tire or an industrial product such as, for example a hose or belt such as, for example a conveyor belt or power transmission belt.

In additional accordance with this invention a tire is provided having a component of the rubber composition prepared according with this invention. In additional accordance with this invention a tire is provided having a tread of the rubber composition prepared according with this invention.

It is a significant aspect of this invention that a composite of elastomer and functionalized carbon black are mixed together under controlled shear and controlled temperature conditions without being limited by the conventional high shear mixing accompanied by largely uncontrollable, autogenous, temperature increase as experienced in classical internal rubber mixers. This aspect is considered herein as being novel and significant because (A) the polymer in an organic solvent solution is at a very high, and possibly its highest possible, dispersion state; and (B) the functionalized carbon black is also at a very high, and perhaps its highest, dispersion state, namely, as a solution, or dispersion, thereof in an organic solvent.

Particular benefits of the process of this invention are considered herein to be:

(A) A relative minimal amount of additional energy is needed for elastomer drying in a case particularly where the elastomer is adsorbed onto the functionalized carbon black or the where the elastomer is mixed, in an organic solution with the functionalized carbon black.

(B) No additional energy or process step is needed for pelletization of functionalized carbon black fillers prior to mixing with the elastomer, which usually the case for dry mixing of carbon black and elastomer in order to reduce carbon black dust, (C) Only a relative minimal energy would be necessary for dispersing te functionalized carbon black in the elastomer to form a composite thereof because such mixing is reduced to a blending of solutions.

(D) An increased uniformity of dispersion of functionalized carbon black in the elastomer for the composite is created, particularly where such fillers may be hydrophobic in nature, in the elastomer because such functionalized carbon black, as a solution or dispersion in the organic solvent, will be in its most dispersible state and because the blending/mixing in solution has the highest dispersion/blending and homogenizing capability as compared to dry blending the ingredients.

(E) A reduction in amount of functionalized carbon black needed for the rubber composition formulation is expected because of better anticipated dispersion of the functionalized carbon black within the elastomer due to solution blending as compared to dry blending of the ingredients.

As hereinbefore discussed, in further practice of the invention, said diene-based elastomer may be provided in a form of a polymerizate cement of such elastomer.

Indeed, a preferable process according to this invention is the utilization of a polymerizate cement of the elastomer instead of re-dissolving the elastomer in a volatile organic solvent.

In additional practice of this invention, the rubber composition prepared by the process of steps (A), (C) and optionally (B) may be in a form of a pre-formed rubber composition, or composite, which is subsequently mixed under high shear and temperature conditions with at least one additional compounding ingredient comprised of at least one of (A) additional diene-based elastomer(s);
(B) zinc oxide;
(C) sulfur;
(D) vulcanization accelerator(s);
(E) microcrystalline waxes;
(F) antidegradants; and
(G) particulate reinforcing filler(s).

In practice, it is often desired that the reinforcing filler is carbon black. While the various conventional, pelletized rubber reinforcing carbon blacks might be used, it is, as hereinbefore discussed, preferred to use an unpelletized carbon black powder having a relatively low apparent density (ASTM method D-1513) before mixing with the elastomer in a range of about 3 to about 140, alternately about 3 to about 300, g/l. Representative of conventional pelletized carbon blacks having higher apparent densities, as hereinbefore discussed, for example, the various N-series of carbon blacks referenced in *The Vanderbilt Rubber Handbook*, 13th Edition, 1990, Page 417. It is to be appreciated that desirable carbon black powders for use in this invention are carbon black powders prior to pelletization to form said conventional pelletized carbon blacks.

Representative of various precipitated silicas are, for example, Zeosil 165Gr and Zeosil 1156MP from Rhodia; VN2, VN3, 3370 Degussa A. G.; Hi-Sil 210from PPG Industries; Zeopol 8745 and 8755 from Huber and Perkasil 233 from Akzo.

In the practice of the invention, various sulfur vulcanizable elastomers may be used, exemplary of which are homopolymers and copolymers of conjugated diene hydrocarbons and copolymers of at least one conjugated diene hydrocarbon with an aromatic vinyl compound selected from styrene and alphamethyl styrene.

Preferred conjugated dienes are isoprene and 1,3-butadiene. Preferred aromatic vinyl compound is styrene.

Representative of various conjugated diene-based elastomers are, for example, cis 1,4-polyisoprene, 1,3-butadiene, styrene/butadiene copolymers, isoprene/butadiene copolymers, styrene/isoprene/butadiene copolymers and any functionalized versions of such elastomers.

Where such conjugated diene-based elastomers are prepared by solvent solution polymerization, such elastomers may be preferably used in their polymerizate form as hereinbefore discussed, namely in the organic solvent solution in their monomers are polymerized to form the elastomer, so that the elastomers do not have to be re-dissolved in a volatile organic solvent.

Various organic solvents may be used for process step of this invention. Representative of such solvents are, for example, hexane, benzene, toluene, cyclohexane, heptane, and tetrahydrofuran. Preferred solvents are, for example, hexane, cyclohexane and heptane.

The rubber composition prepared by the process of this invention is considered herein as being useful, and advantageous, in the preparation of rubber composition as a component of an article of manufacture, instead of dry-blending, or in combination with dry blending, rubber compounding ingredients with rubber because the expected improved dispersion of dispersed ingredients within the elastomer, including reinforcing fillers; expected improved uniformity of dispersion of respective ingredients within the elastomer; improved energy balance because the typical very high energy needed to dry mixing the ingredients in an internal rubber mixer is replaced by a low energy organic solvent mixing process; more efficient use of respective compounding ingredients within the elastomer, including a reduction of quantity; improved efficiency of mixing ingredients within an elastomer ant therefore improved overall manufacturing efficiency.

As hereinbefore discussed, the masterbatched rubber compositions of this invention may be blended with various sulfur vulcanizable diene-based elastomers and/or additional rubber compounding ingredients by compounding by methods generally known in the rubber compounding art, such as mixing in an internal rubber mixer with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 10 phr, if used. Such processing aids can include, for example, aromatic, naphthenic, and/or paraffinic processing oils. Representative silicas may be, for example, hydrated amorphous silicas. Typical amounts of antioxidants comprise about 1 to about 3 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants for the sidewall composition may comprise about 3 to about 6 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The presence and relative amounts of the above additives are considered to be not an aspect of the present invention which is more primarily directed to the masterbatch preparation, in an organic solvent solution, of a pre-formed composite via the use of a pre-functionalized carbon black, and the further preparation and use of rubber compositions which contain such pre-formed composite.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators, including primary and optionally secondary accelerators, are used to control the time and/or temperature required for vulcanization and to improve the properties of the vulcanizate. Often accelerators are used in an amount ranging from about 0.5 to about 2.0 phr. Such accelerators may be, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Sometimes a combination of antioxidants, antiozonants and waxes may be collectively referred to as "antidegradants".

A tire can be built, shaped, molded and cured by various methods, which will be readily apparent to those having skill in such art.

The prepared tire of this invention is conventionally shaped and cured by methods known to those having skill in such art.

In practice, the recovered polymer composite may be used as a component of an article of manufacture such as, for example, a component of a tire and/or industrial product. Such tire component may be, for example and without limitation, a tire tread, sidewall, apex or other sidewall insert, or wire coat compound. Such industrial product may be, for example and without limitation, a hose, conveyor belt or power transmission belt.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a composite comprised of at least one elastomer and a dispersion therein of a functionalized carbon black wherein said process comprises blending a particulate, functionalized carbon black with an organic solvent solution of at least one conjugated diene-based elastomer selected from at least one elastomer as a homopolymer of isoprene and/or 1,3-butadiene and elastomer as a copolymer of isoprene and/or 1,3-butadiene with styrene, followed by removing said solvent therefrom to recover said composite, wherein said functionalized carbon black is a rubber reinforcing carbon black modified by having domains of at least one moiety on the surface thereof selected from (A) silanol, siloxane, titanium oxide, titanium hydroxide, zirconium oxide, zirconium hydroxide and aluminum hydroxide groups;

(B) aryl polysulfide, alkyl polysulfide, thiol, thiophenol, epoxide, allyl and vinyl groups; and (C) dibenzyldisulfide, ditolydisulfide, bis(propyl) disulfide, bis(propyl)tetrasulfide, n-propyl thiol, n-butyl thiol, orthomethylthiophenol, n-propyl epoxide, n-butyl epoxide, methyl allyl, propyl allyl, methyl vinyl and propyl vinyl groups;

wherein said composite is thereafter blended with an amorphous precipitated silica and reinforcing carbon black.

2. The process of claim 1 wherein said organic solvent solution of at least one conjugated diene-based elastomer is composed of two individual organic solutions of elastomers, wherein:

(A) said organic solvent solutions of elastomers are pre-blended prior to addition of said functionalized carbon black, or (B) at least one of said organic solvent solutions of elastomers is blended with at least one of said organic solvent solutions of elastomers subsequent to said functionalized carbon black addition, or (C) at least one of said organic solvent solutions of elastomers is blended with at least one of said additional organic solvent solutions of elastomers simultaneously with said functionalized carbon black.

3. The process of claim 2 wherein said solvent of solutions of said elastomers are polymerizates wherein at least one of the polymerizates is a living polymerizate in which the polymerization has not been terminated so that that the polymer of the living polymerizate may interact with the functionalized carbon black filler.

4. A composite is comprised of an elastomer with a dispersion therein of a functionalized carbon black prepared by the method of claim 3.

5. The process of claim 1 wherein said subsequently blended reinforcing carbon black is an unpelletized carbon black having an apparent density in a range of from about 3 to about 140 g/l.

6. The process of claim 2 wherein said organic solvent solutions of elastomers are pre-blended prior to addition of said functionalized carbon black.

7. The process of claim 2 wherein one of said organic solvent solutions of elastomers is blended with the other said organic solvent solutions of elastomers subsequent to said functionalized carbon black addition.

8. The process of claim 2 wherein one of said organic solvent solution of elastomers is blended with the other said organic solvent solution of elastomers simultaneously with said functionalized carbon black.

9. The process of claim 1 wherein said amorphous precipitated silica is pre-treated prior to blending with said composite by reacting said amorphous precipitated silica with a bis(3-ethoxysilylpropyl) polysulfide having an average of from 2 to 2.6, or from 3.5 to 4, connecting sulfur atoms in its polysulfidic bridge.

* * * * *